Feb. 7, 1950 N. C. HEYMAN 2,496,666

PHONOGRAPHIC TOY TELEPHONE

Filed June 9, 1945 3 Sheets-Sheet 1

INVENTOR.
Nicholas C. Heyman
BY
J. B. Felshin
ATTORNEY.

Feb. 7, 1950 N. C. HEYMAN 2,496,666

PHONOGRAPHIC TOY TELEPHONE

Filed June 9, 1945 3 Sheets-Sheet 2

INVENTOR.
Nicholas C. Heyman
BY
J. B. Felshin
ATTORNEY.

PHONOGRAPHIC TOY TELEPHONE

Filed June 9, 1945 3 Sheets-Sheet 3

INVENTOR.
Nicholas C. Heyman
BY
J. B. Felshin
ATTORNEY.

Patented Feb. 7, 1950 2,496,666

UNITED STATES PATENT OFFICE 2,496,666

PHONOGRAPHIC TOY TELEPHONE

Nicholas C. Heyman, New York, N. Y.

Application June 9, 1945, Serial No. 598,429

4 Claims. (Cl. 274—9)

This invention relates to toy telephones.

An object of this invention is to provide a toy telephone combined with a record player so arranged that the reproduction of the record is played through the telephone receiver.

A further object of this invention is to provide a toy telephone of the character described provided with a dial and means to wind a spring motor for operating the turn table of the record player, upon turning the dial.

Yet a further object of this invention is to provide a toy telephone of the character described provided with a receiver bar on which the telephone receiver is placed, and means to move the tone arm of the record player to a position for starting playing of the record when the telephone receiver is lifted from the receiver bar, and means for lifting the tone arm off the record when the receiver is replaced on the receiver bar.

Yet a further object of this invention is to provide in a toy telephone of the character described a lever having a handle projecting from the telephone casing and arranged to permit picking up the reproducer or tone arm from the record.

Yet a further object of this invention is to provide in a toy telephone of the character described a tube connecting the tone arm or reproducer with the telephone receiver so that when the record is played, a person holding the receiver to the ear may hear the sound.

Yet a further object of this invention is to provide in a device of the character described, a brake for the spring motor, means to set the brake when the receiver is placed on the receiver bar, and means to release the brake when the receiver is removed from the receiver bar.

Still another object of this invention is to provide a neat, compact and durable device of the character described which shall be relatively inexpensive to manufacture, attractive in appearance, easy to manipulate, and yet practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown various possible illustrative embodiments of this invention, Fig. 1 is a front elevational view of a toy telephone embodying the invention;

Figure 1:
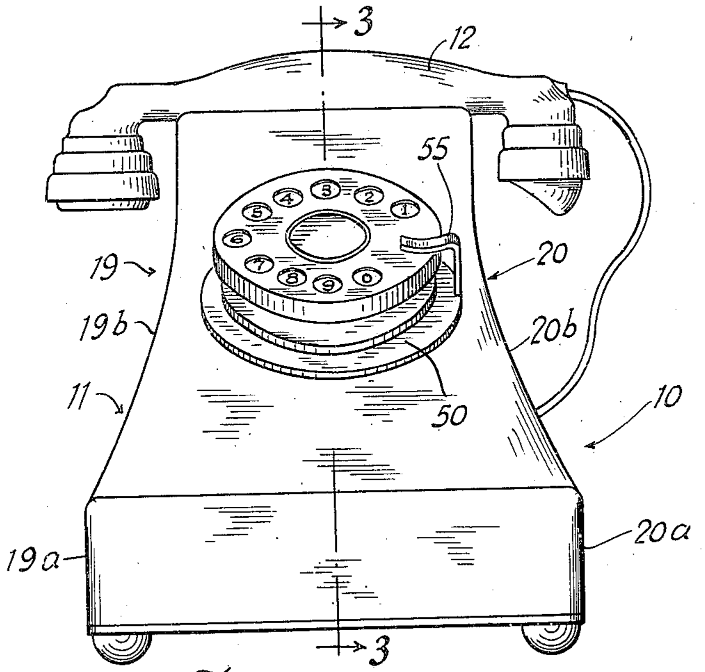
Figure 2:
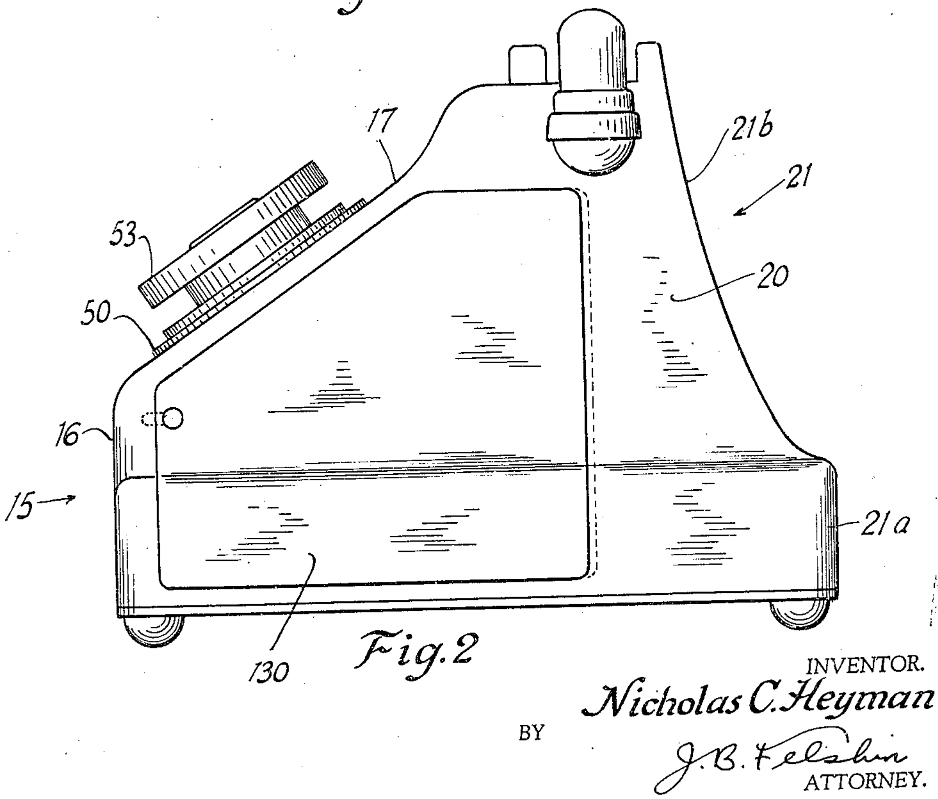
Fig. 2 is a side elevational view thereof.

Referring now in detail to the drawing, 10 designates a toy telephone embodying the invention. The same comprises a stand or casing 11 and a receiver 12 mounted thereon. The stand 11 comprises a top casing 13 open at the bottom, and a bottom cover 14 attached to the underside thereof. The casing 13 comprises a front wall 15 having a lower vertical portion 16 and an upwardly and rearwardly inclined portion 17. Said casing furthermore comprises side walls 19 and 20 which also have lower vertical portions 19a and 20a, respectively, and upwardly and inwardly inclined portions 19b and 20b, respectively.

Said casing 13 further comprises a rear wall 21 which comprises a lower vertical portion 21a and an upwardly and inwardly inclined portion 21b. At the top of the casing 13 are front and rear parallel vertical guide walls 24 and 25, and a horizontal wall 26 interconnecting said guide walls. Between the walls 24 and 25 is a groove 27 for receiver 12. The groove 27 is open at its ends so that the receiver 12 may rest within the groove. The bottom wall 26 is formed with a through slot 29 for the purpose hereinafter appearing.

Mounted on the bottom wall 14 is a record player 30. The record player 30 comprises three horizontal plates 31, 32 and 33 interconnected by vertical posts 34 to form a frame work. Journalled in the plates 31, 32 is a vertical shaft 34a. Rotatably mounted on the shaft 34a is a spring motor casing 35. Interconnecting the shaft with the casing is a usual torsion spring of a spring motor. On casing 35 is a gear 36 meshing with a gear 37 supported on a vertical shaft 38 supported on plates 31 and 33, and passing through an opening 32a in plate 32. On shaft 38 is a gear 39 meshing with a gear 40 mounted on a vertical shaft 41 supported by plates 32 and 33. On shaft 41 is a gear 42 meshing with a gear 43 of a vertical shaft 44, the lower end of which abuts plate 32. The shaft 44 passes through an opening 33a in plate 33. Mounted on the upper end of shaft 44 is the turn table 45.

On shaft 34a is a ratchet 34b. Pivoted to plate 31 is a pawl 46 adapted to engage the ratchet wheel 34b.

It will be understood that rotation of the shaft 34a in one direction will wind the spring motor, and that the pawl and ratchet prevent rotation of the shaft in an opposite direction. When the spring is wound it will rotate the casing 35 and through various gearing will rotate the turn table.

On shaft 38 is a governor 48 of any suitable construction to maintain uniform speed. The gearing is selected to preferably produce 78 R. P. M. on the turn table.

Means is provided for turning the shaft 34a for winding the spring motor. To this end there is mounted on wall portion 17, an annular ring or bearing 50. Rotatably mounted on wall 17 is a member 51 formed with an annular outwardly extending flanges 52 journalled within the annular ring 50.

Attached to member 51 is an annular dial member 53 simulating the dial of the telephone. Fixed to ring 50 is a finger stop 55 such as used in a telephone. The dial member 53 is formed with a central downwardly extending stem 59. Journalled in a bushing 56 on wall 17 is a shaft 57 co-axial with respect to stem 59. Fixed to wall 17 and projecting into member 51 is a post 58. On the stem 59 is a torsion spring 59a, one end of which is attached to the stem and the other end of which is attached to post 58. As the dial is turned in a clockwise direction, looking at Fig. 1, the torsion spring 59 is wound. When the finger is removed from the dial, the torsion spring returns the dial to normal position. Any suitable stop may be provided to retain the dial in normal position. On shaft 57 is a ratchet 60. Pivoted to member 51 is a spring pressed pawl 61 engaging the ratchet. The pawl is so arranged that when the dial is being rotated in a clockwise direction, the pawl 61 engaging the ratchet 60, will rotate shaft 57. The dial may then freely rotate back to normal position when released. Interconnecting shaft 57 with shaft 34a is a flexible shaft 62. It will now be understood that by rotating the dial, the spring motor will be wound up through the shaft 62. A small record may be placed on the turn table 45. The turn table may be played by means of a reproducer or tone arm 65 mounted on any suitable support 66 within the casing. The tone arm is mounted to swing about a vertical axis and also about a horizontal axis.

Slidably mounted in slot 29 is a receiver bar 70. Attached to the ends of the receiver bar are a pair of vertical downwardly projecting plungers 71. Within the casing is a horizontal support 72. Mounted on the support are a pair of vertical tubes 73. The plungers 71 slidably project down into the tubes 73. At the lower ends of the plungers 71 are heads 71a. Interposed between the heads 71a and the bottom of the tubes are coil compression springs 74. The receiver bar 70 is formed at the upper end thereof with a forwardly extending flange 70a.

Figure 6:
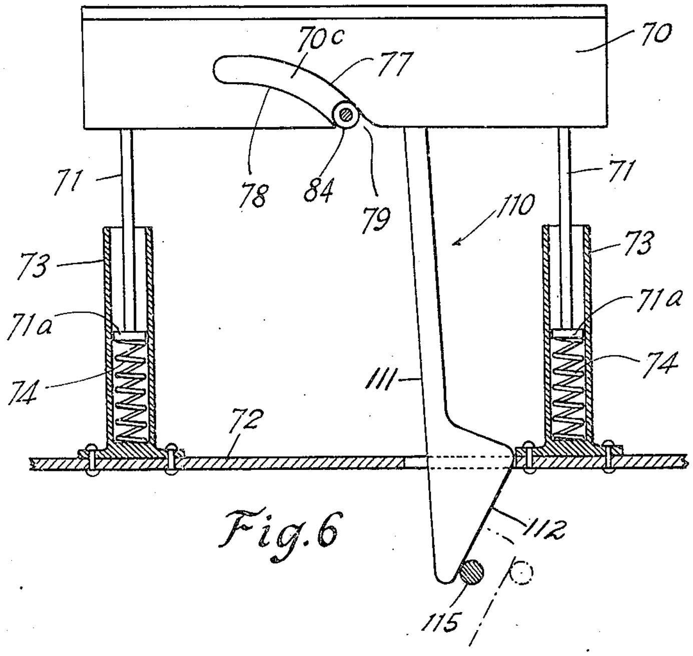
Fig. 6 is a cross-sectional view taken on line 6—6 of Fig. 3.

Means is provided to move the tone arm to a position where it will start playing a record on the turn table, when the receiver is lifted off the receiver bar; and for lifting the tone arm up, away from the record, upon replacing the receiver on the receiver bar after the record has been played. To this end the receiver bar 70 is formed on the inner face 70b thereof with a curved slot 70c extending to the lower edge of the receiver bar. The slot 70c is formed with an upper curved edge 77, and a lower curved edge 78, as shown in Fig. 6 of the drawing. The slot 70c curves upwardly and to one side from the mouth 79 thereof at the lower edge of the receiver bar. On the support 72 is a vertical tubular support 80. Rotatably mounted therein is a vertical bar 81. Pivoted to the upper end of the bar 81, as at 82, is a lever 83. On one end of the lever 83 is a roller 84 projecting into the slot 70c. Pivoted to the opposite end of lever 83 is an L-shaped member 85 comprising a downwardly extending vertical arm 86 and a horizontal arm 87 at the lower end of said vertical arm. The horizontal arm 87 projects beneath the tone arm 65. It will now be understood that when the receiver is off the receiver bar 70, the receiver bar is in the position shown in Figs. 3, 4 and 6. Arm 87 is out of contact with the tone arm and the record is played. When the record has been fully played, the receiver is put on the receiver bar, which moves downwardly against the compression spring 74. As the bar 70 moves downwardly, roller 84 contacts edge 77 of slot 70c, thus rotating the lever 83 in a clockwise direction about a horizontal axis, looking at Fig. 3, to raise the L-shaped arm 85 and causing arm 87 to lift the tone arm off the record.

Figure 4:
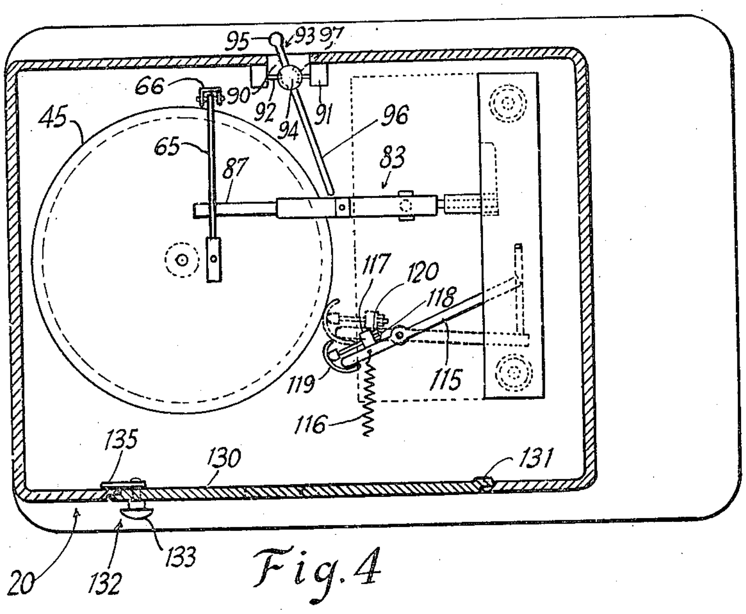
Fig. 4 is a cross-sectional view taken on line 4—4 of Fig. 3.

It will be noted that lever 83 is also rotated in a counterclockwise direction about a vertical axis looking at Fig. 4 to cause the arm 87 to move the tone arm 65 in a counterclockwise direction about a vertical axis to a point just above the starting position. The tone arm is held out of contact with respect to the record while the receiver is down.

Figure 3:
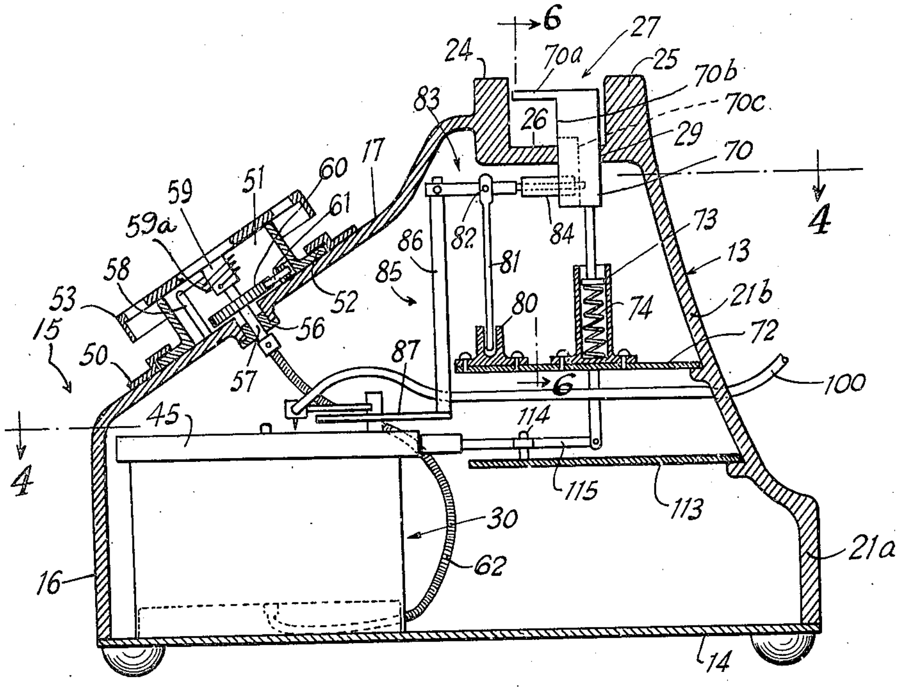
Fig. 3 is a cross-sectional view taken on line 3—3 of Fig. 1 with the receiver removed.
Figure 5:
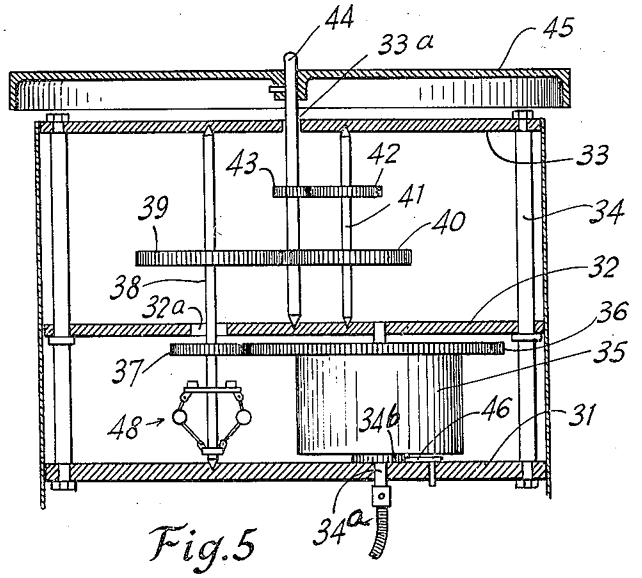
Fig. 5 is an elevational cross-sectional view of the spring motor and turn table of the record player.

When the receiver is raised, spring 74 moves the receiver bar upwardly, causing roller 84 to engage edge 78 of slot 70c thereby rotating lever 83 in a counterclockwise direction about a horizontal axis looking at Fig. 3, to lower member 85, and disengage arm 87 from the tone arm, thereby permitting the needle on the tone arm to engage the record. Lever 83 is then moved in a clockwise direction about a vertical axis looking at Fig. 4 to the position shown in Fig. 4. During such movement arm 87 is not in contact with, but is spaced below, the tone arm, to permit the record to be played.

Means is provided to lift the tone arm in the event that the arm 87 does not lift it for any reason. To this end a wall of the casing is formed with a through opening 90. Fixed to the inside of the wall at opposite sides of opening 90 are abutments 91. Fixed to the abutments 91 are horizontally aligned pins 92, extending toward each other. Mounted on the pins 92 is an emergency lever 93. Lever 93 is formed with an enlarged, annular fulcrum 94. Extending to one side of the fulcrum 94 is a handle 95. Extending to the opposite side of the fulcrum is an arm 96 adapted to engage beneath the tone arm. The fulcrum 94 is formed at opposite sides thereof with arcual slots 97. The pins 92 project into the arcual slots 97. With such construction, the lever 93 may be pivoted about a vertical axis as well as a horizontal axis to permit proper manipulation for engaging the tone arm. Arm 96 of the lever may be moved beneath the tone arm and then the lever may be swung about a horizontal axis to lift the tone arm off the record, if for any reason the arm 87 does not do so.

Means is provided to carry the sound from the tone arm to the receiver. To this end, a flexible tube 100 is interconnecting at one end to the tone arm, and at the other end to the receiver 12. The receiver 12 may be provided with a diaphragm and the sound is carried from the tone arm through the tube to the receiver.

Means is provided to apply a brake to the turn table when the receiver is placed on the receiver bar and to release the brake when the receiver is lifted off the bar. To this end there is attached to the lever bar 70 a vertical downwardly extending brake member 110. At the lower end of member 110 is a cam portion 111 formed with a cam edge 112. Within the casing is a horizontal support 113. On the support 113 is a pivot 114. Pivoted thereto is a lever 115. One arm of the lever 115 contacts edge 112 of the cam 111. The other arm of the lever is connected by a coil tension spring 116 which tends to rotate the lever in a counterclockwise direction, looking at Fig. 4, for retaining the lever in engagement with the cam edge 112. On the lever is a lug 117. Screwed thereto is a screw 118 carrying at one end a brake shoe 119. On the screw 118 is a lock nut 120 to retain the screw in adjusted position.

It will now be understood that when the receiver bar is down, cam head 111 has rotated the lever 115 in a clockwise direction looking at Fig. 4 to move the brake shoe 119 into engagement with the periphery of the turn table. When the receiver is removed from the receiver bar, said bar moves upwardly and carries member 110 upwardly therewith, thereby permitting spring 116 to rotate the lever 115 in a counterclockwise direction to release the brake. The brake tension may be adjusted by means of the screw 118.

Access may be had to the inside of the casing for the purpose of replacing records and renewing needles and for other purposes, by means of a door 130. The side wall 20 of the casing is formed with an opening which is closed by the door 130. The door 130 may be formed with a flange 131 at one end to engage an edge of the opening. At the other end of the bar is a latch 132 rotatably mounted on the door. The latch 132 is formed with a handle 133 outside the door and with a tongue 135 on the inside to engage an opposite edge of wall 20 at the opening. By turning latch 132, the door may easily be released and removed from the casing.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrated and not in a limiting sense.

Having thus described my invention, I claim as new and desire to secure by Letters Patent:

1. A toy telephone comprising a casing, a record player within the casing, a depressible receiver bar formed with a slot therein on the casing, a receiver on the receiver bar, said record player including a tone arm, and means controlled by removal of the receiver off the receiver bar, for lifting the tone arm off the record on the turn table of the record player, said means comprising a member within said casing pivoted for movement about vertical and horizontal axes, one end portion of said pivoted member extending beneath said tone arm, the other end portion of said pivoted member, comprising a cam member received within said slot of said receiver bar.

2. A toy telephone comprising a stand, a receiver bar slidably mounted on the stand, spring means to raise the receiver bar, a record player within the stand including a tone arm, and means controlled by movement of the receiver bar for moving the tone arm, and means independent of the last means for moving the tone arm, said independent means comprising a member pivotally mounted within the stand for movement about longitudinal and vertical axes, an end portion of said member adapted to engage an under portion of said tone arm, the other end portion of said member extending outside of said stand and adapted to be manually controlled.

3. In a toy telephone, a casing, a receiver bar slidably mounted on said casing, said receiver bar being formed with a slot, spring means to raise the receiver bar, a record player within the casing, said record player including a tone arm, said tone arm being pivoted for movement about horizontal and vertical axes, a member pivoted within said casing for movement about horizontal and vertical axes, said member comprising an end portion adapted to engage an under surface of said tone arm, said member having another end portion slidably movable within the slot in said receiver bar whereby movement of said receiver bar will impart vertical and horizontal motion to the end portion of said member contacting the under surface of said tone arm.

4. In a toy telephone, a casing, a receiver bar slidably mounted on said casing, spring means to raise the receiver bar, a record player within the casing, said record player including a tone arm, said tone arm being pivoted at one end for movement about horizontal and vertical axes, a member pivoted within said casing, said member being connected at one end thereof to said receiver bar and having its other end engaging the under surface of said tone arm, said receiver being formed with a cam slot and a cam disposed in said slot for operating said pivotal member upon movement of said receiver bar whereby movement of said receiver bar will import horizontal and vertical motion to said tone arm.

NICHOLAS C. HEYMAN.

REFERENCES CITED

The following references are of record in the file of this patent:

UNITED STATES PATENTS

| Number | Name | Date |
|---|---|---|
| 1,494,802 | Poppe | May 20, 1924 |
| 1,554,105 | La Riviere | Sept. 15, 1925 |
| 1,651,508 | Bocchino | Dec. 6, 1927 |
| 1,888,802 | Jansen | Nov. 22, 1932 |
| 2,265,318 | Sempre | Dec. 9, 1941 |